US011385519B2

(12) United States Patent
Huh et al.

(10) Patent No.: US 11,385,519 B2
(45) Date of Patent: Jul. 12, 2022

(54) DISPLAY DEVICE, HEAD MOUNTED DISPLAY DEVICE, AND METHOD FOR MANUFACTURING HEAD MOUNTED DISPLAY MODULE

(71) Applicant: Samsung Display Co., Ltd., Yongin-si (KR)

(72) Inventors: SuJung Huh, Yongin-si (KR); Jaejoong Kwon, Suwon-si (KR); Soomin Baek, Hwaseong-si (KR); Jiwon Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 143 days.

(21) Appl. No.: 16/706,360

(22) Filed: Dec. 6, 2019

(65) Prior Publication Data
US 2020/0209706 A1    Jul. 2, 2020

(30) Foreign Application Priority Data

Jan. 2, 2019 (KR) .......................... 10-2019-0000413

(51) Int. Cl.
*G02F 1/29* (2006.01)
(52) U.S. Cl.
CPC ................ *G02F 1/29* (2013.01); *G02F 1/294* (2021.01)

(58) Field of Classification Search
None
See application file for complete search history.

(56) References Cited

U.S. PATENT DOCUMENTS

| 2016/0062454 | A1* | 3/2016 | Wang | G09G 5/003 345/633 |
|---|---|---|---|---|
| 2017/0115491 | A1* | 4/2017 | Shi | G02B 27/0176 |
| 2017/0371076 | A1* | 12/2017 | Hua | G02B 3/10 |
| 2018/0190038 | A1* | 7/2018 | Luebke | G06F 3/013 |
| 2018/0307044 | A1* | 10/2018 | Oh | G02B 27/0176 |
| 2019/0025475 | A1* | 1/2019 | Piskunov | G02B 25/00 |

FOREIGN PATENT DOCUMENTS

JP                 407351 B2       4/2008

* cited by examiner

*Primary Examiner* — Ryan Crockett
(74) *Attorney, Agent, or Firm* — Lewis Roca Rothgerber Christie LLP

(57) ABSTRACT

A display device includes: a display panel having a central part and a peripheral part surrounding the central part, the display panel comprising a plurality of pixels; and a lens array on the display panel, wherein: the lens array comprises a first lens on the central part and a second lens on the peripheral part; a first focal length of the first lens is smaller than a second focal length of the second lens; and each of the first lens and the second lens overlaps at least two pixels among the plurality of pixels.

15 Claims, 16 Drawing Sheets

DISPLAY DEVICE, HEAD MOUNTED DISPLAY DEVICE, AND METHOD FOR MANUFACTURING HEAD MOUNTED DISPLAY MODULE

CROSS-REFERENCE TO RELATED APPLICATION

This application claims priority to and the benefit of Korean Patent Application No. 10-2010-0000413, filed on Jan. 2, 2019, the entire contents of which are hereby incorporated by reference.

BACKGROUND

Aspects of some example embodiments of the present disclosure herein relate to a display device and a head mounted display device with improved display qualities, and a method for manufacturing a head mounted display module.

A head mounted display device is a display device worn on the head of a user and may be used for implementing augmented reality or virtual reality. The head mounted display device for implementing augmented reality may provide a virtual graphic image through a semi-transparent display. In this case, a user may simultaneously view a virtual graphic image and an actual object. The head mounted display device for implementing virtual reality displays a virtual graphic image that is visible by the user. The user may experience virtual reality through virtual content displayed by the display device.

The above information disclosed in this Background section is only for enhancement of understanding of the background and therefore it may contain information that does not constitute prior art.

SUMMARY

Aspects of some example embodiments of the present disclosure include a display device and a head mounted display device with improved display qualities, and a method for manufacturing a head mounted display module.

According to some example embodiments of the inventive concept, a display device includes: a display panel having a central part and a peripheral part surrounding the central part, the display panel including a plurality of pixels; and a lens array on the display panel, wherein the lens array includes a first lens on the central part and a second lens on the peripheral part; a first focal length of the first lens is smaller than a focal length of the second lens; and each of the first lens and the second lens overlaps at least two pixels among the plurality of pixels.

According to some example embodiments, the display device may further include a body part accommodating the display panel and the lens array, wherein two opening parts may be located in one region of the body part facing the lens array.

According to some example embodiments, a curvature of the first lens may be larger than a curvature of the second lens.

According to some example embodiments, refractive indexes of the first lens and the second lens may be the same as each other.

According to some example embodiments, a thickness of the first lens may be larger than a thickness of the second lens.

According to some example embodiments, the display device may further include: a first electrode under the first lens and the second lens; and a second electrode on the first lens and the second lens, wherein each of the first lens and the second lens may include reactive compounds and liquid crystal molecules.

According to some example embodiments, fixed regions, in which orientation directions of the liquid crystal molecules are fixed by the reactive compounds, may be defined in the lens array; the fixed regions may include a first fixed region included in the first lens and a second fixed region included in the second lens; and an area of the first fixed region and an area of the second fixed region may be different from each other.

According to some example embodiments, an area of the first fixed region may be smaller than an area of the second fixed region.

According to some example embodiments, thicknesses of the first lens and the second lens may be the same as each other.

According to some example embodiments, the first lens may overlap five pixels among the plurality of pixels in a plan view.

According to some example embodiments, the five pixels may include a center pixel on a center and four peripheral pixels surrounding the center pixel.

According to some example embodiments, a center of the first lens may overlap the center pixel in the plan view.

According to some example embodiments, the center pixel may be a green pixel, two peripheral pixels among the four peripheral pixels may be red pixels, and the remaining two peripheral pixels may be blue pixels.

According to some example embodiments, the center pixel may be a red pixel or a blue pixel, and the four peripheral pixels may be green pixels.

According to some example embodiments of the inventive concept, in a method for manufacturing a head mounted display module, the method includes: forming a display panel having a central part and a peripheral part surrounding the central part, the display panel comprising a plurality of pixels; forming a lens array comprising a first lens and a second lens having different shapes from each other, wherein: the first lens is formed on the central part; the second lens is formed on the peripheral part; and each of the first lens and the second lens overlaps at least two pixels among the plurality of pixels in a plan view.

According to some example embodiments, the forming of the lens array may include: forming a photoresist layer on the display panel; positioning a mask on the photoresist layer; and patterning the photoresist layer to form the first lens and the second lens.

According to some example embodiments, a central opening pattern overlapping the central part in the plan view and a peripheral opening pattern overlapping the peripheral part in the plan view may be defined in the mask; and a size of the central opening pattern and a size of the peripheral opening pattern may be different from each other.

According to some example embodiments, the forming of the lens array may include: forming, on the display panel, a preliminary layer in which reactive compounds and liquid crystals are mixed; positioning a mask on the preliminary layer; and forming fixed regions in which orientation directions of the liquid crystals are fixed, wherein the fixed regions may include a first fixed region corresponding to the first lens and a second fixed region corresponding to the second lens, and an area of the first fixed region may be smaller than an area of the second fixed region.

According to some example embodiments, a focal length of the first lens with respect to light incident in a first direction may be smaller than a second focal length of the second lens with respect to light incident in the first direction.

According to some example embodiments of the inventive concept, a head mounted display device includes: a display panel having a central part and a peripheral part surrounding the central part, the display panel comprising a plurality of pixels; and a lens array on the display panel, wherein: the lens array includes a first lens on the central part and a second lens on the peripheral part; a first focal length of the first lens is smaller than a focal length of the second lens; and each of the first lens and the second lens overlaps at least two pixels among the plurality of pixels.

BRIEF DESCRIPTION OF THE FIGURES

The accompanying drawings are included to provide a further understanding of the inventive concept, and are incorporated in and constitute a part of this specification. The drawings illustrate aspects of some example embodiments of the inventive concept and, together with the description, serve to explain aspects of the inventive concept. In the drawings.

DETAILED DESCRIPTION

Figure 1:
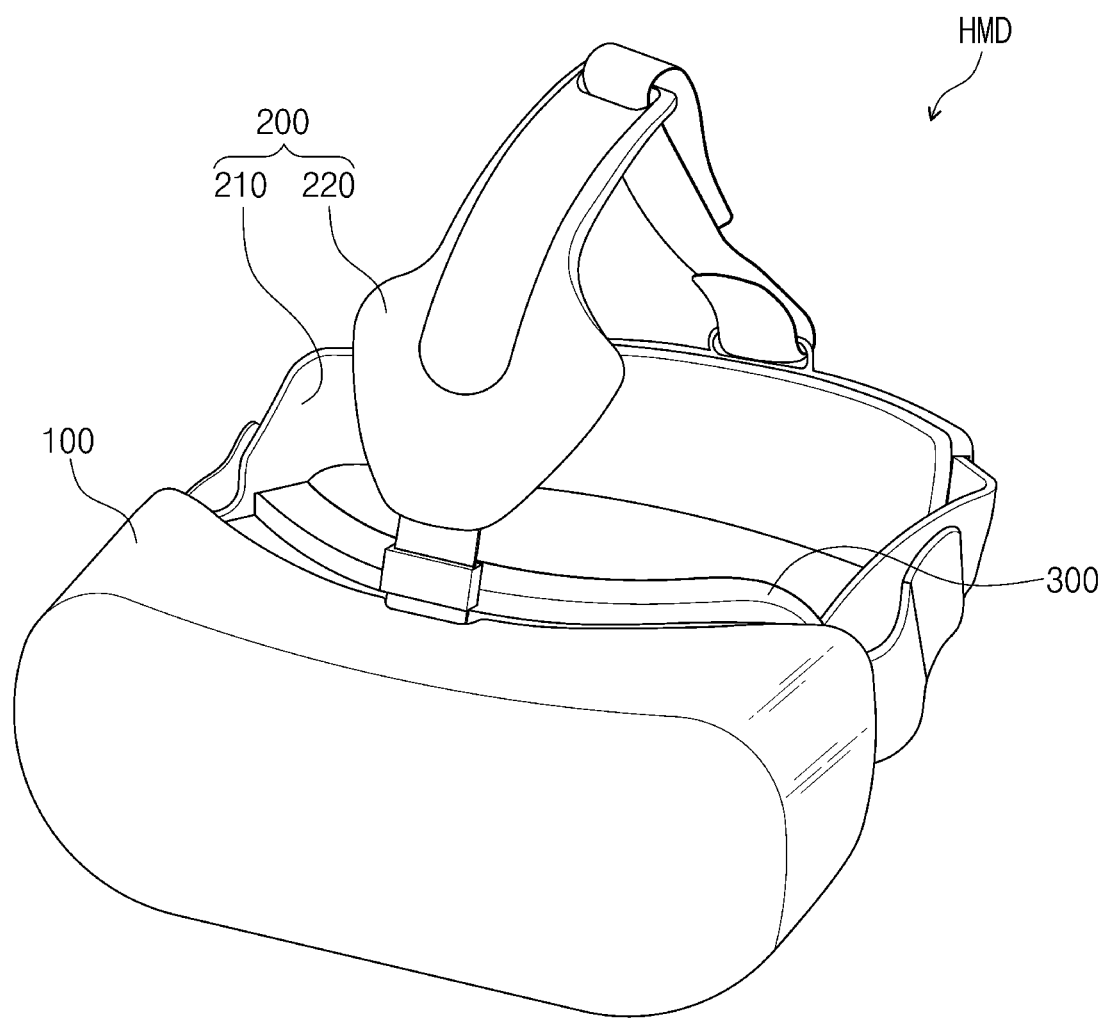
FIG. 1 is a perspective view of a display device according to some example embodiments of the inventive concept.

In the description, it will be understood that when an element (or a region, a layer, portion, etc.) is referred to as being "on", "connected to" or "coupled to" another element or layer, it can be directly on, connected or coupled to the other element or a third intervening element may be present.

Like reference numerals refers to like elements. Also, in the figures, the thicknesses, the ratios and the dimensions of elements are exaggerated for effective illustration of technological contents.

As, used herein, the term "and/or" includes all of one or more combinations that can be defined by associated items.

It will be understood that although the terms "first" and "second" may be used herein to describe various elements, these elements should not be limited by these terms. The terms are only used to distinguish one element from other elements. For example, a first element may be referred to as a second element and the second element may similarly be referred to as the first element without departing from the scope of the present invention. The terms of a singular form may include plural forms unless obviously referred to the contrary in context.

In addition, terms such as "below", "lower", "above", and "upper" may be used to describe the relationship between features illustrated in the figures. The terms have relative concept, and are described on the basis of the orientation illustrated in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless so defined herein.

It will be further understood that the terms "includes" or "has", when used in this specification, specify the presence of stated features, numbers, steps, operations, elements, components or combinations thereof, but do not preclude the presence or addition of one or more other features, integers, steps, operations, elements, components, and/or combinations thereof.

Hereinafter, embodiments of the inventive concept will be described with reference to the accompanying drawings.

Figure 2:
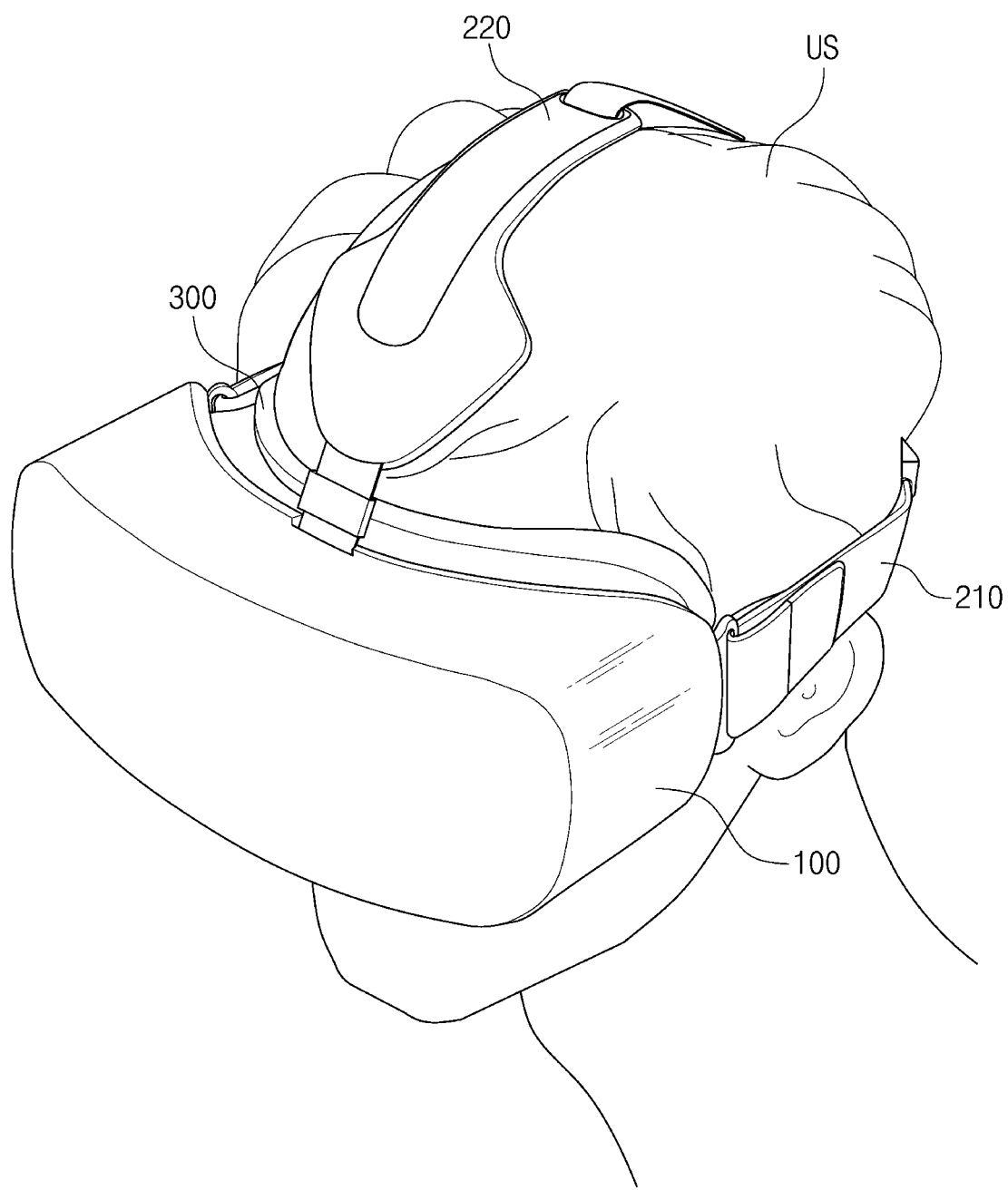
FIG. 2 is a use view of a display device according to some example embodiments of the inventive concept.

FIG. 1 is a perspective view of a display device according to some example embodiments of the inventive concept. FIG. 2 is a use view of a display device according to some example embodiments of the inventive concept.

Referring to FIGS. 1 and 2, a display device HMD may be a head mounted display device which can be worn on the head of a user US. The display device HMD may provide an image while the actual peripheral field of view of the user US is blocked. Because the peripheral field of view of the user US wearing the display is blocked, the user may more easily be immersed in virtual reality.

Figure 3:
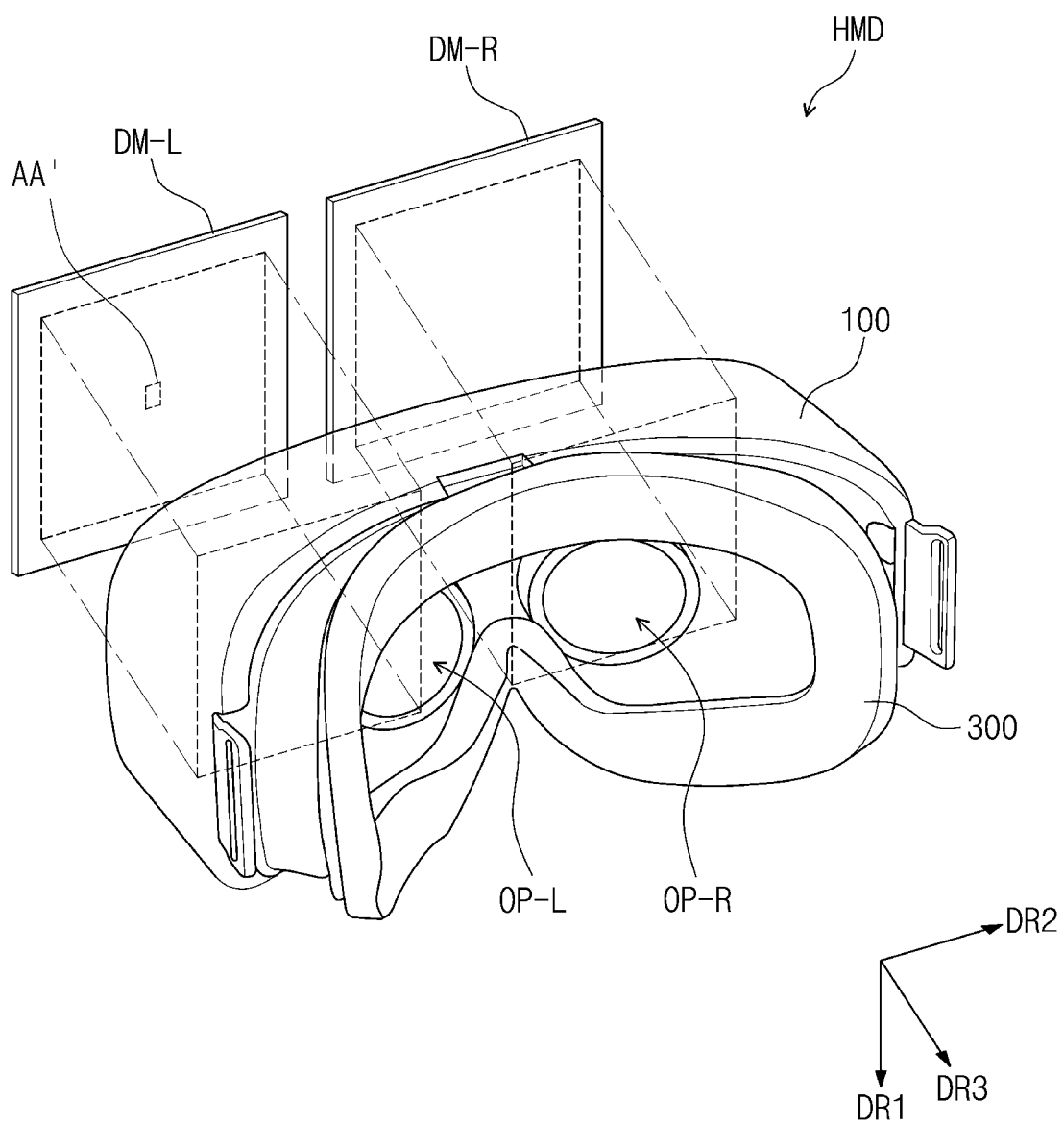
FIG. 3 is an exploded perspective view of a portion of a display device according to some example embodiments of the inventive concept.

The display device HMD may include a body part 100, a strap part 200, a cushion part 300, and display modules DM-L and DM-R (see FIG. 3).

The body part 100 may be worn on the head of the user US. One or more display modules DM-L and DM-R for displaying an image, an acceleration sensor, and the like may be accommodated inside the body part 100. The acceleration sensor may detect the movement of the user US and transmit a predetermined signal to the display modules DM-L and DM-R. Accordingly, the display modules DM-L and DM-R may provide an image corresponding to the change in the viewing line of the user US. Thus, the user US may experience virtual reality similar to actual reality.

The body part 100 may accommodate components having various functions. For example, an operation part for adjusting a sound volume, the brightness of a screen, or the like may further be arranged on the outside of the body part 100. The operation part may be provided as a physical button, in a form of a touch sensor or the like. In addition, the display device HMD may also further include a proximity sensor for determining whether or not the user US is wearing the display device.

The strap part 200 may be coupled to the body part 100. The body part 100 may be worn on the user US by means of the strap part 200. The strap part 200 may include a main strap 210 and an upper strap 220.

The main strap 210 may be worn along the periphery of the head of the user US. The main strap 210 may allow the body part 100 to be brought into in close contact with the head of the user US. The upper strap 220 may connect the body part 100 and the main strap 210 along the upper portion of the head of the user US. The upper strap 220 may prevent or reduce instances of the body part 100 sliding down. In addition, the upper strap 220 may distribute the load of the body part 100 and further improve the wearing comfort of the user US.

FIG. 1 shows an example structure in which the lengths of the main strap 210 and the upper strap 220 may be adjusted, but the embodiments of the inventive concept are not limited thereto. For example, according to some example embodiments, the main strap 210 and the upper strap 220 have elasticity, and a length-adjustable portion may be omitted. In addition, the main strap 210 and the upper strap 220 may have an integrated shape.

When the display device HMD may be fixed to the user US, the body part 100 and the strap part 200 may be modified into various shapes aside from the shapes shown in FIGS. 1 and 2. For example, according to some example embodiments of the inventive concept, the upper strap 220 may not be provided. In addition, according to some example embodiments of the inventive concept, the display device HMD may be modified into various shapes such as a helmet shape or an eyeglass shape.

The cushion part 300 may be arranged on one surface of the body part 100. The one surface may be a surface facing the user US when the user US uses the display device HMD. The cushion part 300 may include a material which may have a freely modified or pliable shape. The cushion part 300 may include a polymer resin. For example, the cushion part 300 may include polyurethane, polycarbonate, polypropylene, or polyethylene, or a sponge which is foam shaped by using a rubber liquid, a urethane-based material, or an acrylic material. However, the material constituting the cushion part 300 is not limited to the above examples.

The cushion part 300 may improve the wearing comfort of the display device HMD. The cushion part 300 is removable from the body part 100. According to some example embodiments of the inventive concept, the cushion part 300 may also be omitted.

FIG. 3 is an exploded perspective view of a portion of a display device according to some example embodiments of the inventive concept.

Referring to FIG. 3, the display modules DM-L and DM-R may include a left-eye display module DM-L and a right-eye display module DM-R. FIG. 3 shows an example in which the display device HMD includes two display modules DM-L and DM-R, but example embodiments of the inventive concept are not limited thereto. For example, according to some example embodiments of the inventive concept, the display device HMD may also include only one display module. That is, the left-eye display module DM-L and a right-eye display module DM-R may be integrally provided.

Two openings OP-L and OP-R may be provided in one region of the body part 100. The openings OP-L and OP-R may be divided into a left-eye opening OP-L and a right-eye opening OP-R. The user US (see FIG. 2) may view an image provided from the left-eye display module DM-L through the left-eye opening OP-L, and view an image provided from the right-eye display module DM-R through the right-eye opening OP-R.

Figure 4:
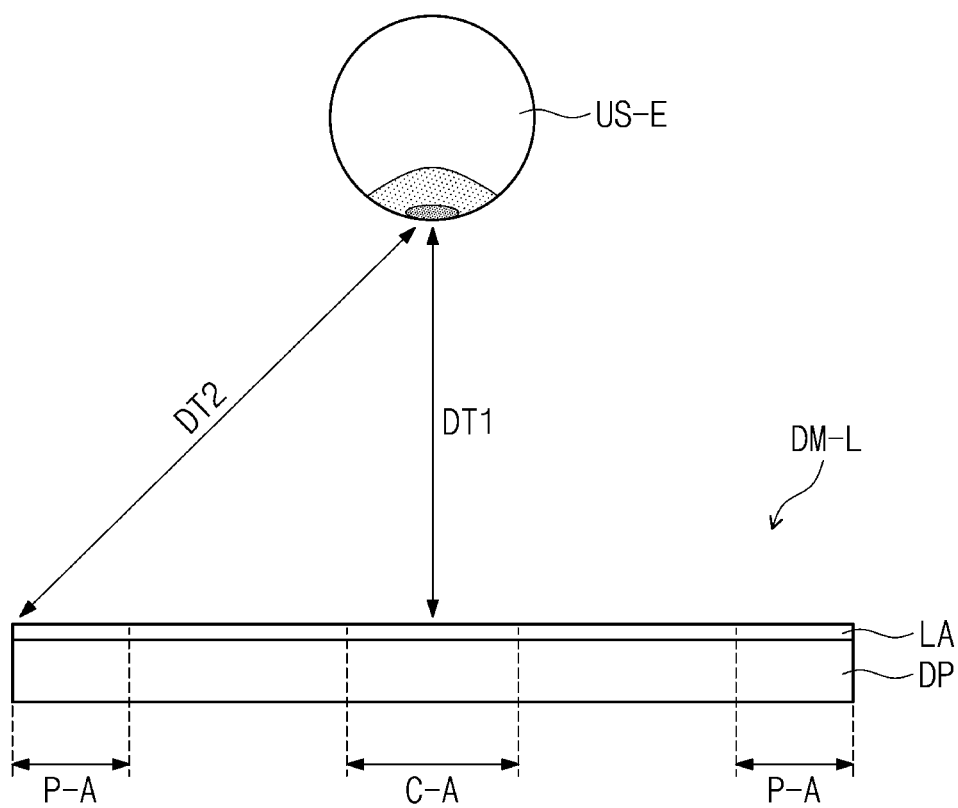
FIG. 4 is a schematic cross-sectional view of a display device according to some example embodiments of the inventive concept.
Figure 5:
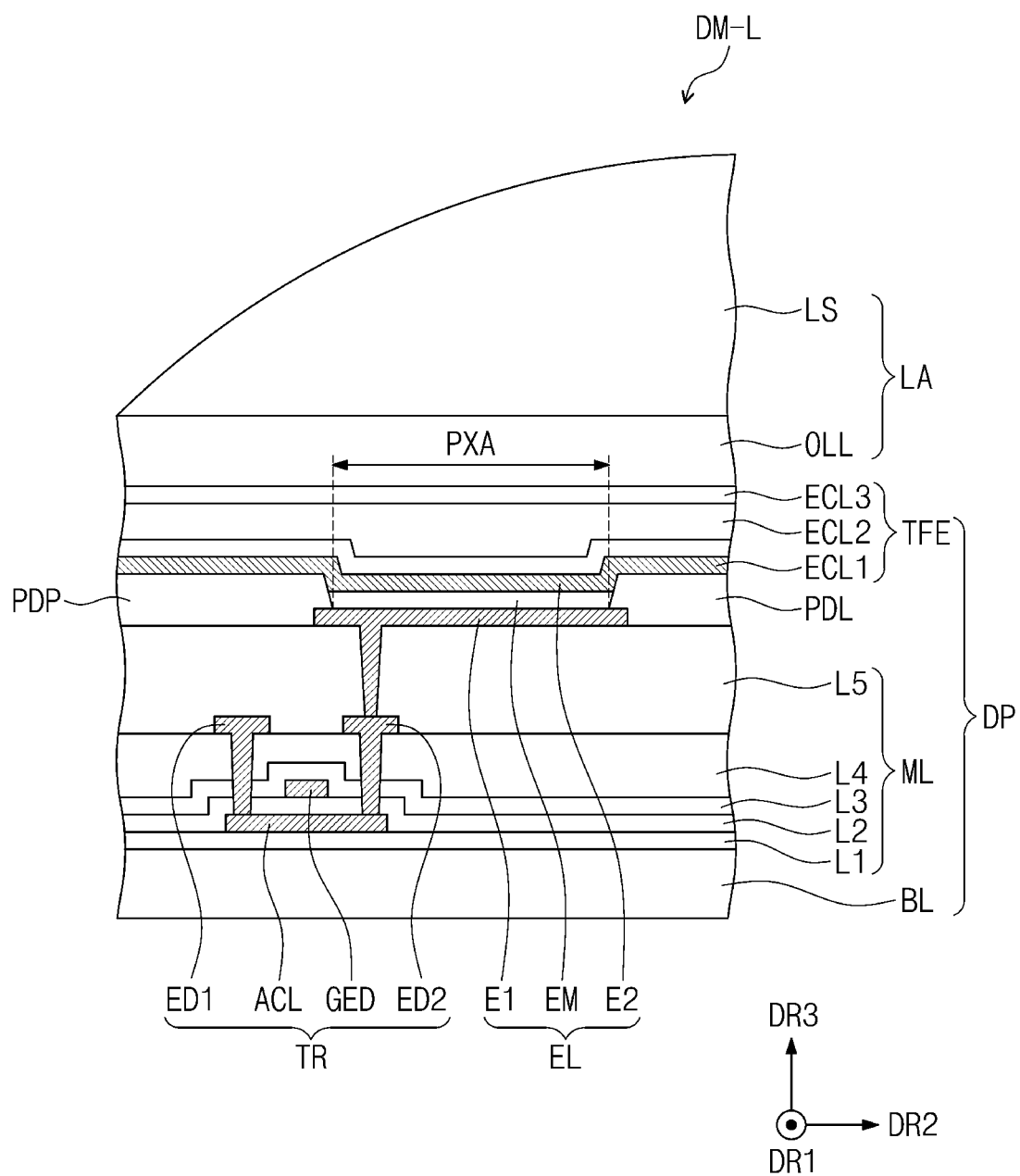
FIG. 5 is a cross-sectional view of a display module according to some example embodiments of the inventive concept.

FIG. 4 is a schematic cross-sectional view of a display device according to some example embodiments of the inventive concept. FIG. 5 is a cross-sectional view of a display module according to some example embodiments of the inventive concept.

Referring to FIGS. 4 and 5, the left-eye display module DM-L and the right-eye display module DM-R (see FIG. 3) may have substantially the same structure. Thus, the left-eye display module DM-L will be described and description on the right-eye display module DM-R will be omitted.

The left-eye display module DM-L may include a display panel DP and a lens array LA.

The display panel DP may generate an image corresponding to input image data. The display panel DP may be include various embodiments. For example, the display panel DP may include an organic light emitting display panel, a liquid crystal display panel, a micro LED display panel, a plasma display panel, an electrophoretic display panel, or an electrowetting display panel. According to some example embodiments, the display panel DP may be an organic light emitting display panel, but the embodiments of the inventive concept are not limited thereto.

The display panel DP may include a base layer BL, a circuit layer ML, a light emitting element layer EL, and a thin film encapsulation layer TFE.

The circuit layer ML may include transistors TR and a plurality of layers L1, L2, L3, L4, and L5.

A first layer L1 is located on the base layer BL, and the transistors TR may be located on the first layer L1. The transistors TR may each include a semiconductor layer ACL, a control electrode GED, a first electrode ED1, and a second electrode ED2.

The semiconductor layer ACL may be located on the first layer L1. The first layer L1 may be a buffer layer which provides a reformed surface on the semiconductor layer ACL. In this case, the semiconductor layer ACL may have higher adhesiveness to the first layer L1 than to the base layer BL. In addition, the first layer L1 may be a barrier layer which protects the lower surface of the semiconductor layer ACL. In this case, the first layer L1 may prevent or reduce instances of contaminants or moisture of the base layer BL itself or introduced through the base layer BL penetrating into the semiconductor layer ACL. Alternatively, the first layer L1 may be a light shield layer which prevents or reduces external light incident through the base layer BL being incident on the semiconductor layer ACL. In this case, the first layer L1 may further include a light-shielding material.

The semiconductor layer ACL may include polysilicon or amorphous silicon. Besides, the semiconductor layer ACL may include a metal oxide semiconductor. The semiconductor layer ACL may include: a channel region which functions as a path through which electrons or holes may move; and a first ion-doped region and a second ion-doped region which are located with the channel region therebetween.

The second insulating layer L2 is located on the first layer L1 and may cover the semiconductor layer ACL. The second insulating layer L2 may include an inorganic material. The inorganic material may include at least any one of silicon nitride, silicon oxy nitride, silicon oxide, titanium oxide, or aluminum oxide.

The control electrode GED may be located on the second insulating layer L2. A third insulating layer L3 is located on the second insulating layer L2 and may cover the control electrode GED. The third insulating layer L3 may include an inorganic material.

A fourth insulating layer L4 may be located on the third insulating layer L3. The first electrode ED1 and the second electrode ED2 may be located on the fourth insulating layer L4. The first electrode ED1 and the second electrode ED2 may be connected to the semiconductor layer ACL via through holes passing through the second insulating layer L2, the third insulating layer L3 and the fourth insulating layer L4.

A fifth insulating layer L5 is located on the fourth insulating layer L4 and may cover the first electrode ED1 and the second electrode ED2. The fifth insulating layer L5 may include a single layer or a plurality of layers. For example, the single layer may include an organic layer. The plurality of layers may be provided by laminating an organic layer and an inorganic layer. The fifth insulating layer L5 may be a flattened layer which provides a flat surface thereon.

A light emitting element layer EL and definition patterns PDP may be located on the fifth insulating layer L5.

The light-emitting element layer EL may include a first electrode E1, a light-emitting layer EM, and a second electrode E2. The first electrode E1 may be located on the fifth insulating layer L5 and be electrically connected to the second electrode ED2 via a through hole passing through the fifth insulating layer L5.

The definition patterns PDP may be located on the circuit layer ML and define a pixel PXA. The definition patterns PDP may cover at least a portion of the first electrode E1 and be located on the fifth insulating layer L5. A portion of the first electrode E1 may not be covered by the definition patterns PDP, and the portion may correspond to the pixel PXA. Accordingly, the definition patterns PDP may also be referred to as pixel definition patterns or pixel definition films.

The light-emitting layer EM may be located between the first electrode E1 and the second electrode E2. The light emitting layer EM may have a single layer structure including a single material, a single layer structure including a plurality of materials different from each other, or a multi-layer structure including a plurality of layers including a plurality of materials different from each other.

The light-emitting layer EM may include an organic material. The organic material is not particularly limited. For example, the light-emitting layer EM may any suitable materials which emit a red, green or blue color, and may also include a fluorescent material or a phosphorescent material.

The second electrode E2 may be located on the light-emitting layer EM and the definition patterns PDP. The second electrode may receive a common voltage.

The thin film encapsulation layer TFE is located on the second electrode E2. The thin film encapsulation layer TFE may directly cover the second electrode E2. According to some example embodiments of the inventive concept, a capping layer which covers the second electrode E2 may further be located between the thin film encapsulation layer TFE and the second electrode E2. In this case, the thin film encapsulation layer TFE may directly cover the capping layer.

The thin film encapsulation layer TFE may include a first inorganic layer ECL1, an organic layer ECL2, and a second inorganic layer ECL3. The organic layer ECL2 may be located between the first inorganic layer ECL1 and the second inorganic layer ECL3. The first inorganic layer ECL1 and the second inorganic layer ECL3 may be formed by depositing an inorganic material, and the organic layer ECL2 may be formed by depositing, printing or coating an organic material.

The first inorganic layer ECL1 and the second inorganic layer ECL3 protect the light emitting element layer EL from moisture and oxygen, and the organic layer ECL2 protects the light emitting element layer EL from foreign substances such as dust particles. The first inorganic layer ECL1 and the second inorganic layer ECL3 may include at least any one of silicon nitride, silicon oxy nitride, silicon oxide, titanium oxide, or aluminum oxide. The organic layer ECL2 may include a polymer, such as, acrylic organic layer. However, this is merely an example, and the embodiments of the inventive concept are not limited thereto.

FIG. 5 illustrates an example in which the thin film encapsulation layer TFE includes two inorganic layers and one organic layer, but the embodiments of the inventive concept are not limited thereto. For example, the thin film encapsulation layer TFE may include three inorganic layers and two organic layers, and in this case, the inorganic layers and the organic layers may have a structure of being alternately laminated.

Referring to FIG. 4, the display panel DP in which a central part C-A and a peripheral part P-A surrounding the central part C-A are defined. When viewed in a plan view, the central part C-A may be a region including the center of the display panel DP. The center may mean the position at which the center of the display panel in a first direction DR1 and the center of the display panel CP in a second direction DR2 overlap. FIG. 4 illustrates an example in which the peripheral part P-A is spaced apart from the central part C-A, but the peripheral part P-A may also be adjacent to the central part C-A.

The lens array LA may be located on a surface of the display panel DP which an image is displayed. The display panel DP may provide an image in the direction toward the thin film encapsulation layer TFE, and in this case, the lens array LA may be located on the thin film encapsulation layer TFE. According to some example embodiments of the inventive concept, when the display panel DP provides or displays an image in the direction toward the base layer BL, the lens array LA may also be located under the base layer BL.

According to some example embodiments of the inventive concept, because the lens array LA is provided on the display panel DP, an optical lens which has been located between the display panel DP and the user's eye US-E may be omitted. Thus, the weight of the display device HMD (see FIG. 1) may be reduced. In addition, because it may be unnecessary to secure a space for positioning the optical lens inside the body part 100 (see FIG. 1), the thickness of the body part 100 (see FIG. 1) may be reduced. According to some example embodiments of the inventive concept, the optical lens may not be located between the display panel DP and the user's eye (US-E). Accordingly, the distance in a first direction DT1 may be no greater than about 50 mm.

The lens array LA may function to enlarge an image provided from the pixels PXA and project an enlarged image on a virtual surface. The user US (see FIG. 2) may view a virtual image enlarged by the lens array LA. The lens array LA may include an optical distance adjustment layer OLL and a plurality of lenses LS.

The optical distance adjustment layer OLL may be a light transmissive layer. The display panel DP and the plurality of lenses LS may be spaced apart a predetermined distance from each other by the optical distance adjustment layer OLL.

A portion of the plurality of lenses LS may have a first focal length and the others may have a second focal length different from the first focal length. The first focal length and the second focal length may be focal lengths with respect to light incident at the same angle. For example, the focal length of the lens located on the central part C-A of the display panel DP may be smaller than the focal length of the lens located on the peripheral part P-A of the display panel DP.

The first direction DT1 between the central part C-A of the display panel DP and the user's eye US-E and the second direction DT2 between the peripheral part P-A of the display panel DP and the user's eye US-E may be different from each other. The first direction DT1 may be a direction perpendicular to the display panel DP, and the second direction DT2 may be a direction inclined with respect to the display panel DP.

A single lens may have different focal lengths according to the direction of light incident thereto. Different directions of light may mean different angles between the light incident to the lens and optical axis of the lens. The focal length with respect to the light perpendicularly incident to the lens may be larger than the focal length of the light obliquely incident to the lens. The perpendicularly incident light may be the light incident in a direction parallel to the optical axis. The obliquely incident light may be the light incident in a direction inclined to the optical axis. That is, when the plurality of lenses of the lens array LA have the same focal length with respect to the light incident in the same direction, the focal length of the light incident to the lens positioned at the central part C-A may be larger than the focal length incident to the lens positioned at the peripheral part P-A.

According to some example embodiments of the inventive concept, the focal length of the lens positioned on the peripheral part P-A may be designed to be longer than the focal length of the lens positioned on the central part C-A. Accordingly, the difference between the focal length of the light obliquely incident to the lens positioned on the peripheral part P-A and the focal length of the light incident to the lens positioned on the central part C-A may be reduced. That is, the deviations between the focal lengths of the image viewed by a user may be reduced. Accordingly, the user may view a video of clear images. In addition, even an image of the peripheral part P-A of the display panel DP may be clearly viewed, and thus, the viewing angle of the user may be increased. That is, the display quality of the display device HMD (see FIG. 1) may be improved.

Figure 6:
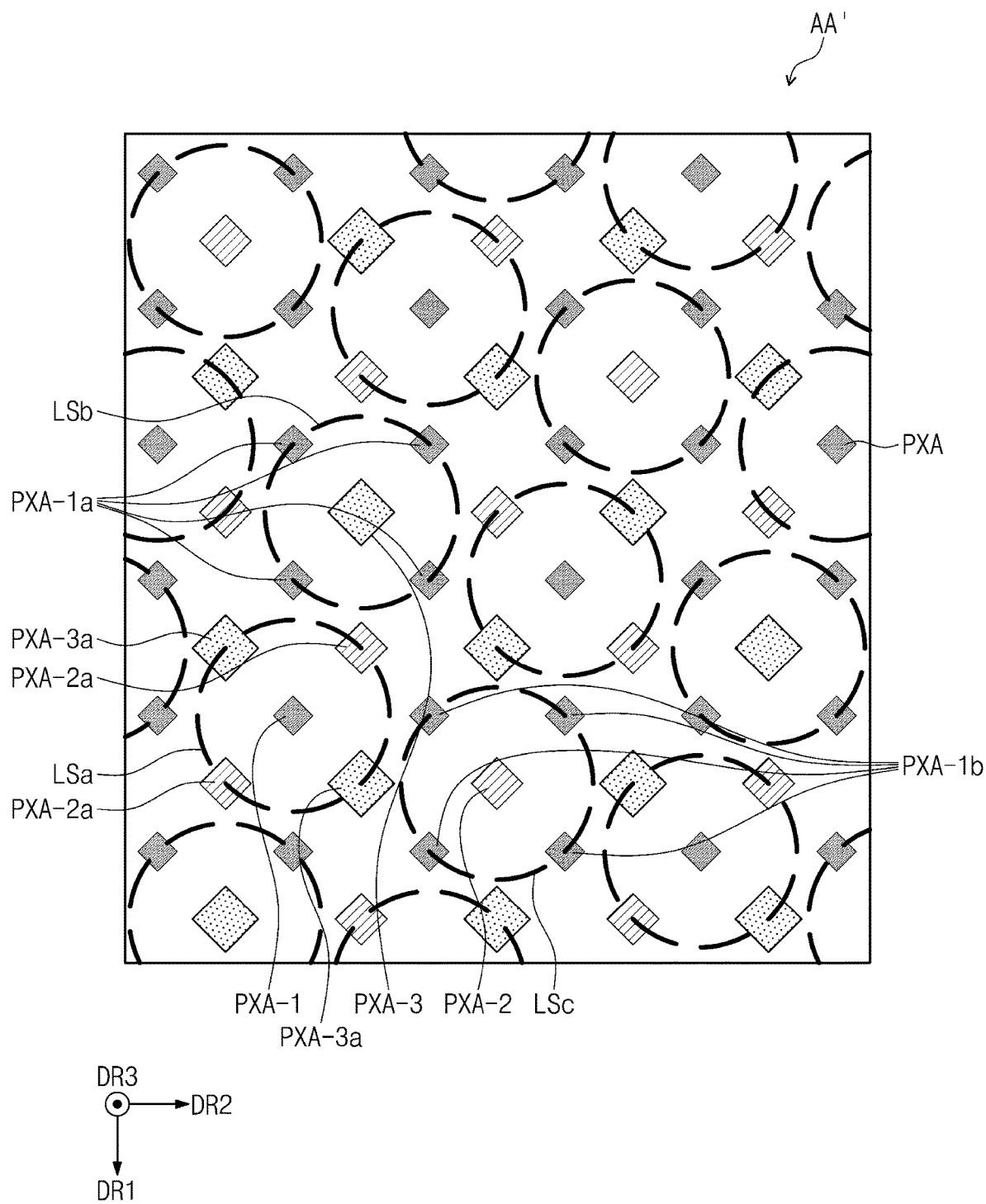
FIG. 6 is an enlarged cross-sectional view of the region AA' shown in FIG. 3.

FIG. 6 is an enlarged cross-sectional view of region AA' shown in FIG. 3.

Referring to FIGS. 5 and 6, the display panel DP may include a plurality of pixels. For example, the plurality of pixels may include first pixels PXA-1, PXA-1a, and PXA-1b which display a first color, second pixels PXA-2 and PXA-2a which display a second color, and third pixels PXA-3 and PXA-3a. The first color, the second color, and the third color may be colors different from each other. For example, the first color may be green, the second color may be red, and the third color may be blue.

The areas of the first pixels PXA-1, PXA-1a, and PXA-1b may be smaller than the areas of the second pixels PXA-2 and PXA-2a and the areas of the third pixels PXA-3 and PXA-3a. The areas of the third pixels PXA-3 and PXA-3a may be larger than the areas of the first pixels PXA-1, PXA-1a, and PXA-1b and the areas of the second pixels PXA-2 and PXA-2a.

The lens array LA may include a plurality of lenses LSa, LSb, and LSc. Each of the plurality of lenses LSa, LSb, and LSc may overlap at least two pixels. The at least two pixels may include pixels having colors different from each other. The plurality of lenses LSa, LSb, and LSc shown in FIG. 6 may be lenses located on the central part C-A (see FIG. 4) of the display panel DP.

When viewed in a plan view, the first lens LSa may overlap five pixels pXA-1, PXA-2a and PXA-3a. The five pixels pXA-1, PXA-2a and PXA-3a may be divided into a single center pixel PXA-1 located at the center and four peripheral pixels PXA-2a and PXA-3a located to surround the periphery of the center pixel PXA-1. The center pixel PXA-1 may be located while overlapping the center of the first lens LSa. The center pixel PXA-1 may be a green first pixel. The two peripheral pixels PXA-2a among the peripheral pixels PXA-2a and PXA-3a may be red second pixels, and the remaining two peripheral pixels PXA-3a may be blue third pixels.

The second lens LSb may overlap five pixels PXA-3 and PXA-1a. The center pixel PXA-3 among the five pixels PXA-3 and PXA-1a may be the blue third pixel, and the four peripheral pixels PXA-1a may be green first pixels. The third lens LSc may overlap five pixels PXA-2 and PXA-1b. The center pixel PXA-2 among the five pixels PXA-2 and PXA-1b may be the red second pixel, and the four peripheral pixels PXA-1b may be green first pixels.

According to some example embodiments of the inventive concept, when the center pixel overlapping a single lens is a green pixel, two peripheral pixels among four peripheral pixels may be red pixels, and the remaining two peripheral pixels may be blue pixels. In addition, when the center pixel overlapping a single lens is a red pixel or a blue pixel, four peripheral pixels may be green pixels.

According to some example embodiments of the inventive concept, a single lens may overlap at least two pixels. That is, the single lens may provide multiple view points to a user, and the user may view a three dimensional image.

Figure 7A:
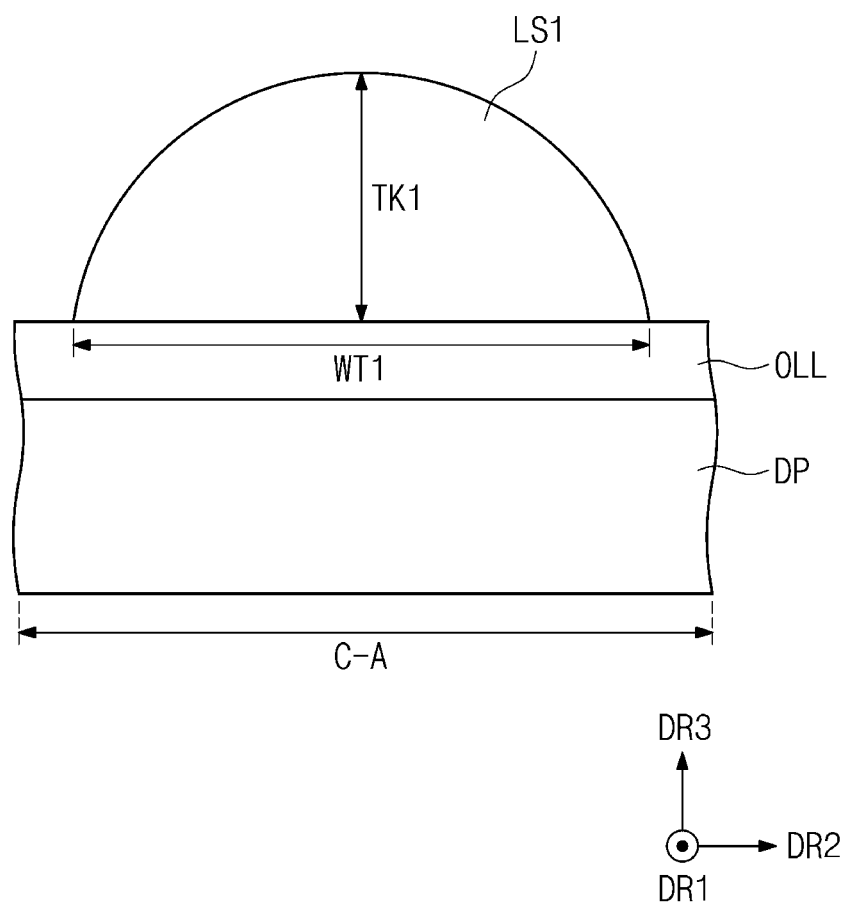
FIG. 7A is an enlarged cross-sectional view of a portion of a display module according to some example embodiments of the inventive concept.
Figure 7B:
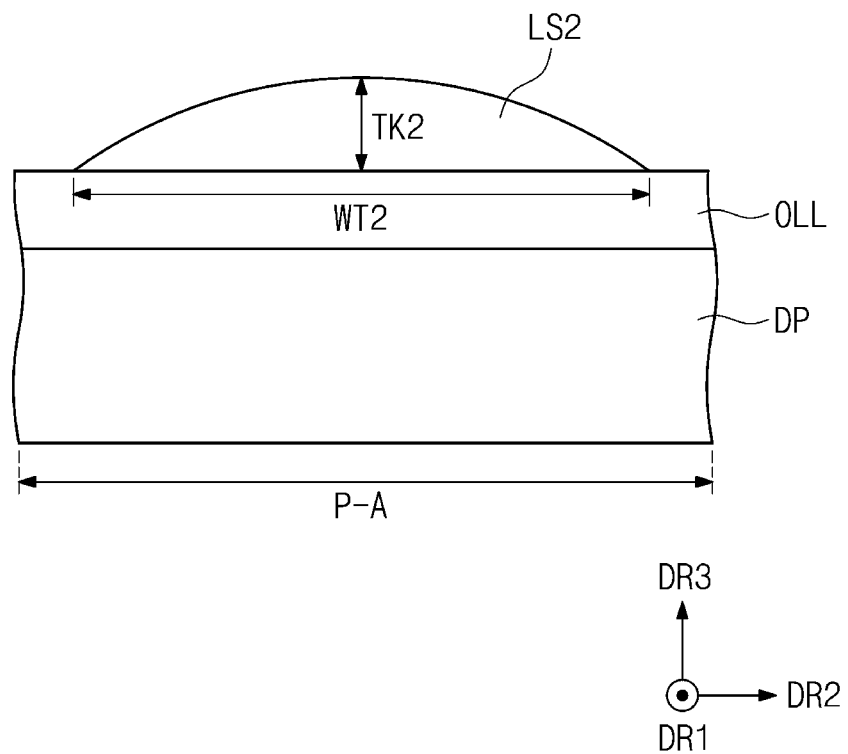
FIG. 7B is an enlarged cross-sectional view of a portion of a display module according to some example embodiments of the inventive concept.

FIG. 7A is an enlarged cross-sectional view of a portion of a display module according to some example embodiments of the inventive concept, and FIG. 7B is an enlarged cross-sectional view of a portion of a display module according to some example embodiments of the inventive concept.

Referring to FIGS. 4, 7A, and 7B, a lens array LA may include a first lens LS1 and a second lens LS2 which have different focal lengths. The first lens LS1 may be located on the central part C-A of the display panel DP, and the second lens LS2 may be located on the peripheral part P-A of the display panel DP.

According to some example embodiments of the inventive concept, considering that the focal length of an image displayed on the peripheral part P-A is smaller than the focal length of an image displayed on the central part C-A, the focal length of the second lens LS2 may be designed to be longer than the focal length of the first lens LS1. Consequently, the deviation between the focal length of an image displayed on the central part C-A and the focal length of an image displayed on the peripheral part P-A may be reduced. Thus, the display quality of the display device HMD (see FIG. 1) may be improved, and a user may view a video of relatively more clear images.

The first lens LS1 and the second lens LS2 may have the same material and the same refractive index as each other. The curvature of the first lens LS1 may be larger than the curvature of the second lens LS2. The curvature may mean the reciprocal of the radius of curvature. The maximum thickness TK1 of the first lens LS1 may be larger than the maximum thickness TK2 of the second lens LS2.

The width WT1 of the first lens LS1 may be the same as the width WT2 of the second lens LS2. Accordingly, as shown in FIG. 6, when viewed in a plan view, the second lens LS2 may also overlap one center pixel and four peripheral pixels. However, the embodiments of the inventive concept are not limited thereto. For example, according to some example embodiments of the inventive concept, the width WT2 of the second lens LS2 may also be larger than or smaller than the width WT1 of the first lens LS1.

According to some example embodiments of the inventive concept, the shape of the first lens LS1 and the shape of the second lens LS2 are different from each other. Accordingly, when light having the same direction is incident to each of the first lens LS1 and the second lens LS2, the focal length of the first lens LS1 and the focal length of the second lens LS2 may be different. FIGS. 7A and 7B illustrate an example method in which the focal lengths of the first lens LS! And the second lens LS2 are made different from each other in order to make the focal lengths of the first lens LS1 and the second lens LS2 different from each other, but the embodiments of the inventive concept are not limited thereto.

According to some example embodiments of the inventive concept, the lens array LA may further include a third lens located between the central part C-A and the peripheral part P-A, and having the curvature between the curvature of the first lens LS1 and the curvature of the second lens LS2.

According to some example embodiments of the inventive concept, the lens array LA is divided into a plurality of regions, and a plurality of lenses located in a single region may all have the same curvature. In this case, the curvatures of the lenses located on a region overlapping the center may be largest. In addition, according to some example embodiments of the inventive concept, the lens array LA may include lenses in each of which the farther from the center, the smaller the curvature of the lenses.

Figure 8A:
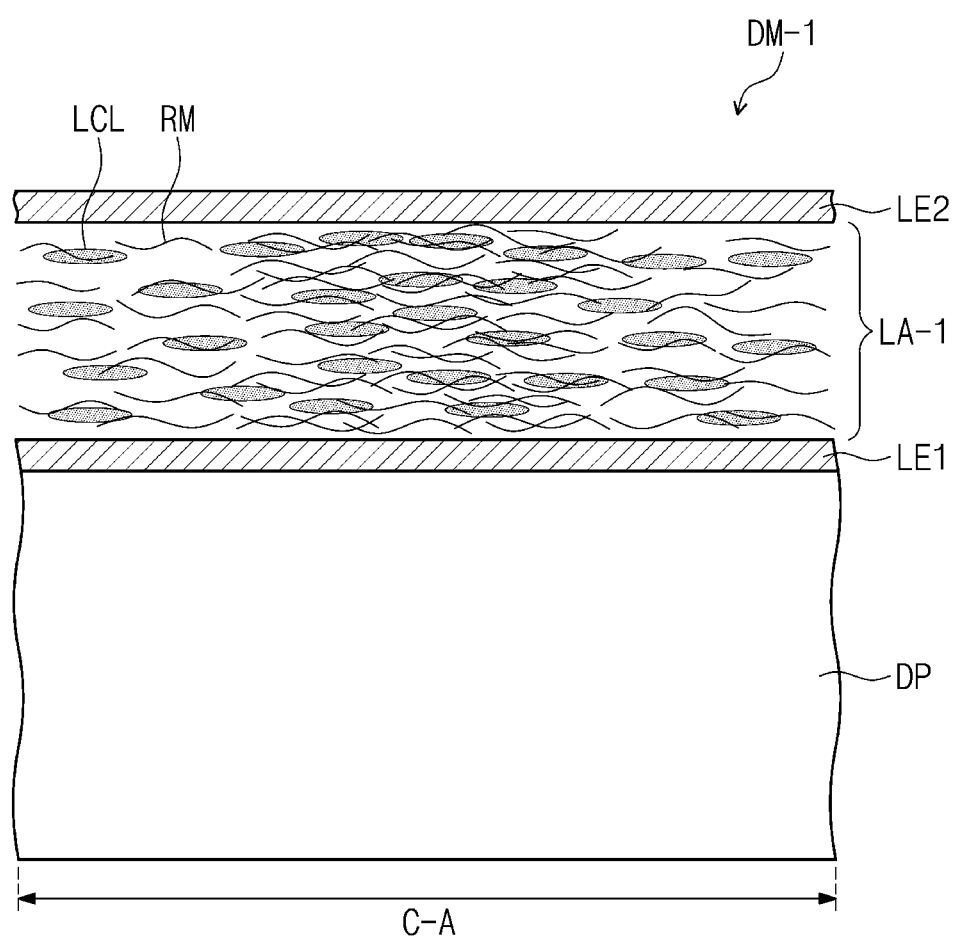
FIG. 8A is an enlarged cross-sectional view of a portion of a display module according to some example embodiments of the inventive concept.

FIG. 8A is an enlarged cross-sectional view of a portion of a display module according to some example embodiments of the inventive concept, FIG. 7B is an enlarged cross-sectional view of a portion of a display module according to some example embodiments of the inventive concept.

Figure 8B:
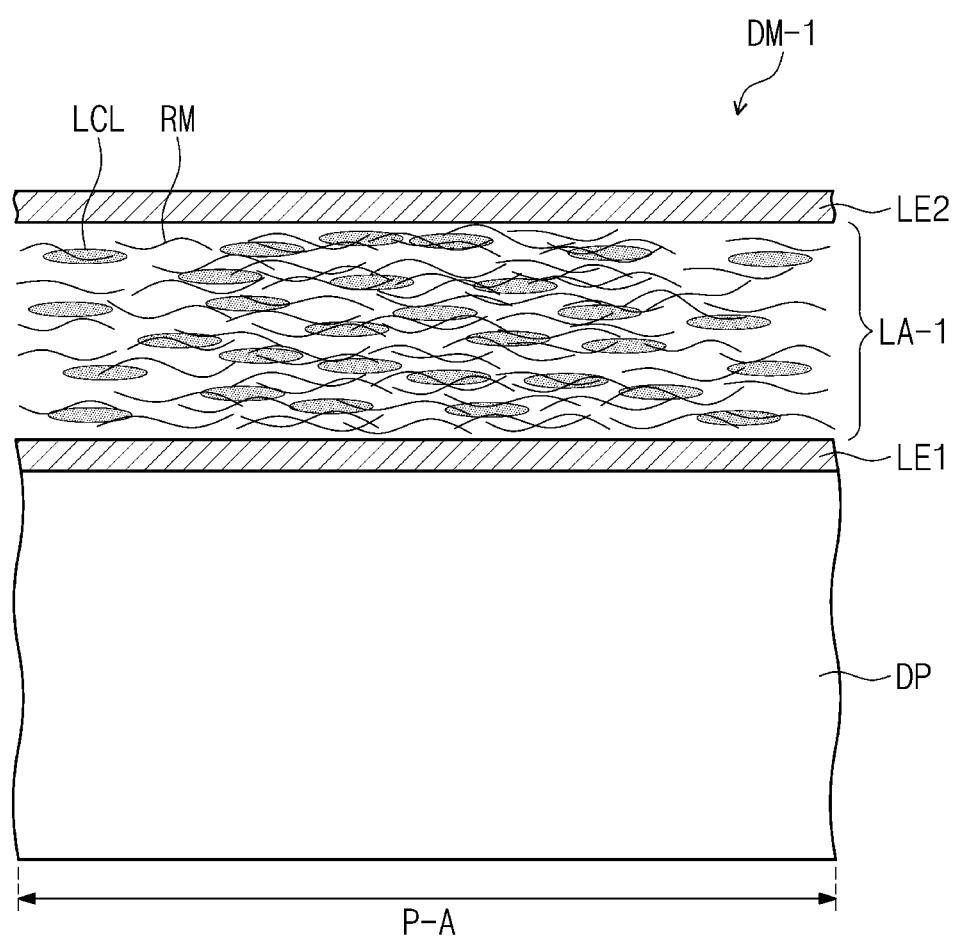
FIG. 8B is an enlarged cross-sectional view of a portion of a display module according to some example embodiments of the inventive concept.

Referring to FIGS. 8A and 8B, a display module DM-1 may include a display panel DP, a lens array LA-1, a first electrode LE1, and a second electrode LE2.

The first electrode LE1 may be located on the display panel DP, the lens array LA-1 may be located on the first electrode LE1, and the second electrode LE2 may be located on the lens array LA-1.

The lens array LA-1 may include reactive compounds RM and liquid crystal molecules LCL. When a voltage is applied to the first electrode LE1 and the second electrode LE2, the orientation states of the liquid crystal molecules LCL are changed, and the refractive index of the lens array LA-1 may be changed according to the orientation states of the liquid crystal molecules LCL.

Figure 9A:
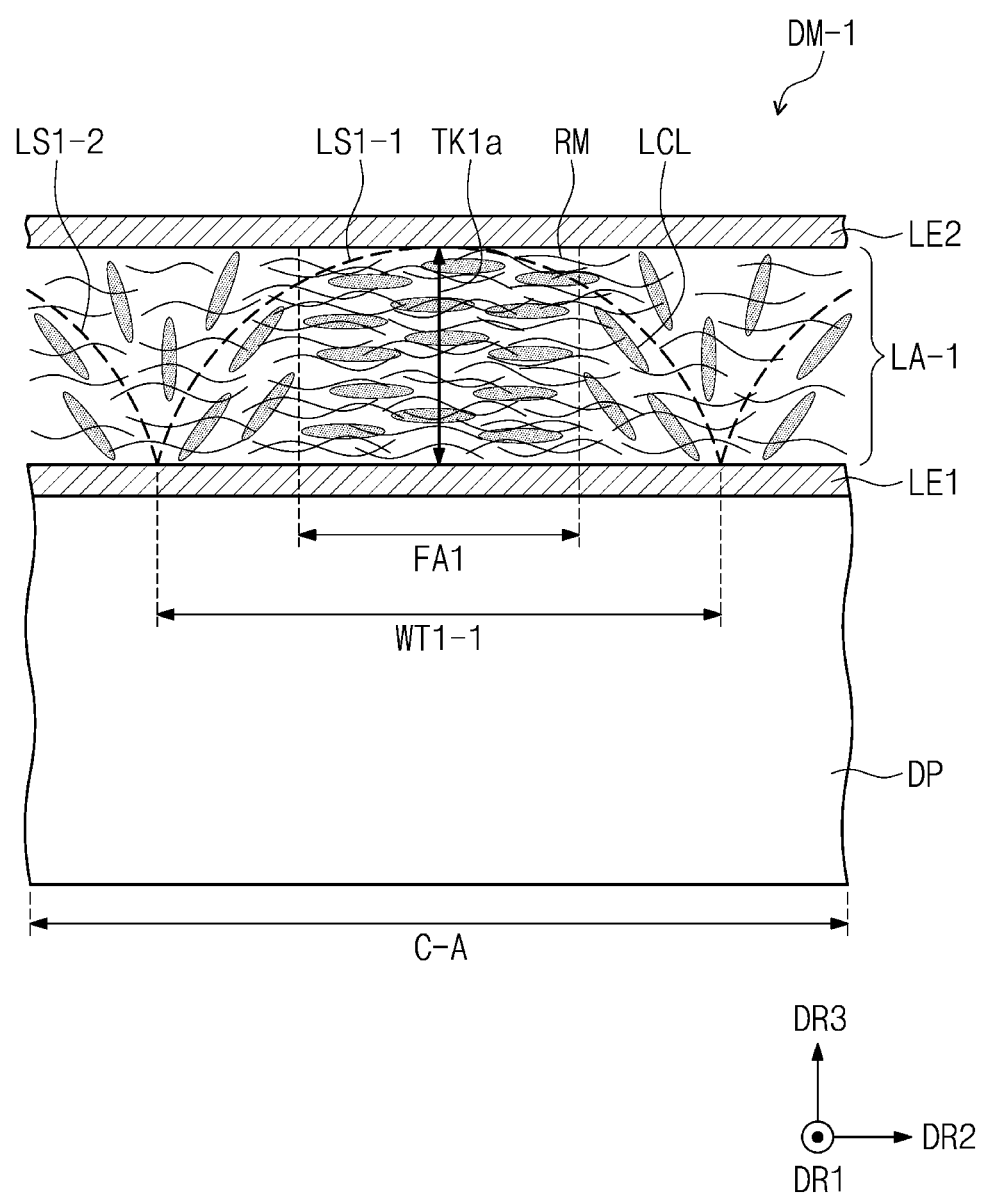
FIG. 9A is an enlarged cross-sectional view of a portion of a display module according to some example embodiments of the inventive concept.
Figure 9B:
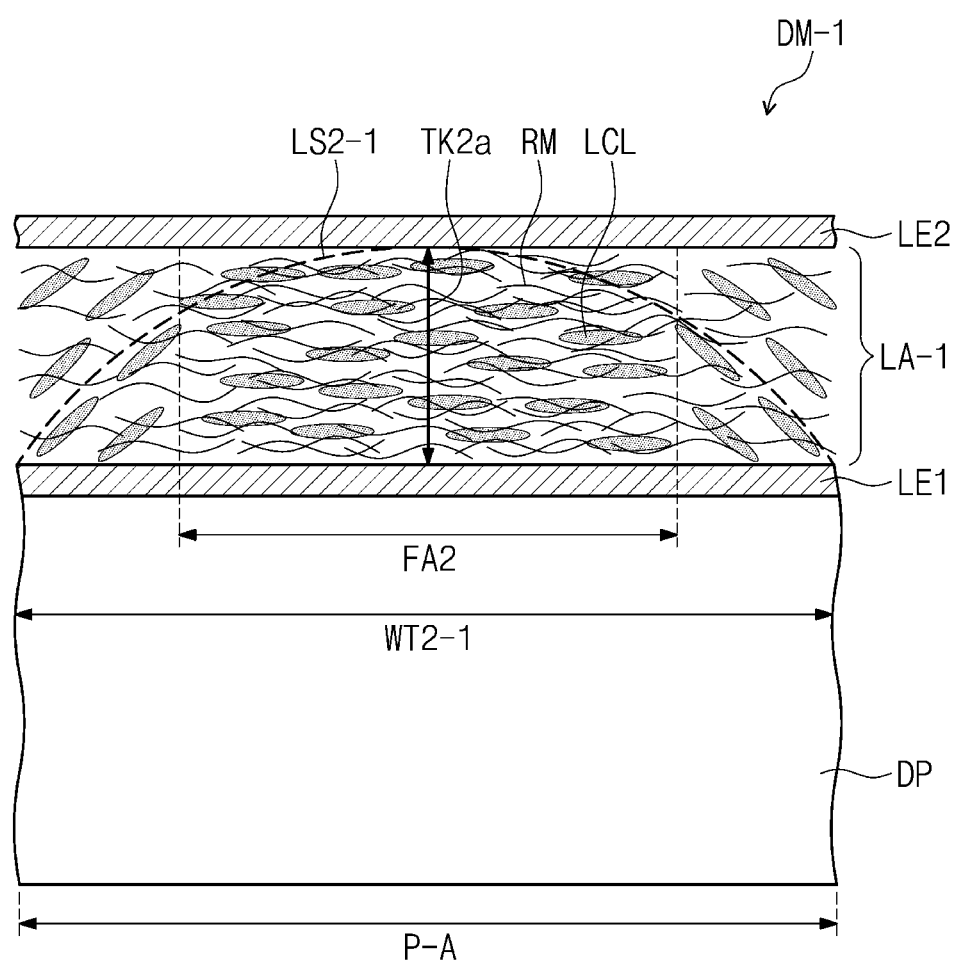
FIG. 9B is an enlarged cross-sectional view of a portion of a display module according to some example embodiments of the inventive concept.

FIG. 9A is an enlarged cross-sectional view of a portion of a display module according to some example embodiments of the inventive concept, FIG. 9B is an enlarged cross-sectional view of a portion of a display module according to some example embodiments of the inventive concept.

FIG. 9A illustrates a state in which a voltage is applied to the first electrode LE1 and the second electrode LE2 of FIG. 8A, and the orientation states of a portion of the liquid crystal molecules LCL are changed. FIG. 9B illustrates a state in which a voltage is applied to the first electrode LE1 and the second electrode LE2 of FIG. 8B, and the orientation states of a portion of the liquid crystal molecules LCL are changed.

Fixed regions FA1 and FA2 may be defined in the lens array LA-1. The fixed regions FA1 and FA2 may include a first fixed region FA1 and a second fixed region FA2. The first fixed region FA1 may be defined on a central part C-A of a display panel DP (see FIG. 4), and the second fixed region FA2 may be defined on a peripheral part P-A of the display panel DP. The area of the first fixed region FA1 may be smaller than the area of the second fixed region FA2. For example, referring to FIGS. 9A and 9B, the width of the first fixed region FA1 in a second direction DR2 may be smaller than the width of the second fixed region FA2 in the second direction DR2.

The liquid crystal molecules arranged on the first fixed region FA1 and the second fixed region FA2 may have orientation directions fixed by reactive compounds RM. Accordingly, even when a voltage is applied to a first electrode LE1 and a second electrode LE2, the orientation directions of the liquid crystal molecules arranged on the first fixed region FA1 and the second fixed region FA2 may not be changed. The liquid crystal molecules arranged on the periphery of the first fixed region FA1 and the second fixed region FA2 may have orientation directions changed according to an electric field generated between the first electrode LE1 and the second electrode LE2. As the orientation directions of the liquid crystal molecules change, a first lens LS1-1 including the first fixed region FA1 and a second lens LS2-1 including the second fixed region FA2 may be defined. The first lens LS1-1 and the second lens LS2-1 are depicted by dotted lines.

A first thickness TK1$a$ of the first lens LS1-1 and a second thickness TK2$a$ of the second lens LS2-1 may be the same as each other. The first thickness TK1$a$ and the second thickness TK2$a$ may correspond to the distance between the first electrode LE1 and the second electrode LE2.

A first width WT1-1 of the first lens LS1-1 and a second thickness WT2-1 of the second lens LS2-1 may be different from each other. The first width WT1-1 may be smaller than the second width WT2-1. Accordingly, the curvature of the first lens LS1 may be larger than the curvature of the second lens LS2-1. In addition, because first width WT1-1 is smaller than the second width WT2-1, the pitch between the first lenses LS1-1 and LS1-2 located on the central part C-A may be smaller than the pitch between the second lenses located on the peripheral part P-A.

The area of the first fixed region FA1 included in the first lens LS1-1 and the area of the second fixed region FA2 included in the second lens LS2-1 are different from each other. Accordingly, when light having the same direction is incident to each of the first lens LS1-1 and the second lens LS2-1, the focal length of the first lens LS1-1 and the focal length of the second lens LS2-1 may be different.

FIGS. 10A to 10D are cross-sectional views illustrating a method for manufacturing a display module according to some example embodiments of the inventive concept.

Figure 10A:
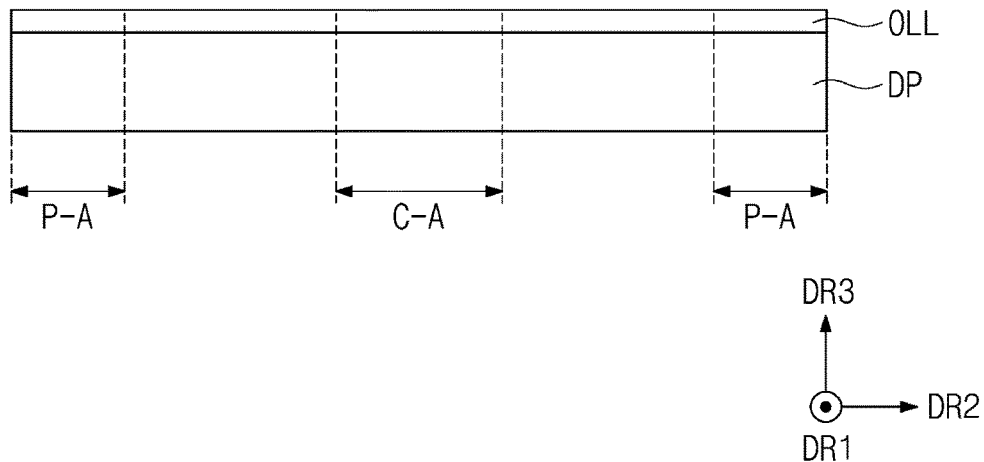
FIGS. 10A to 10D are cross-sectional views illustrating a method for manufacturing a display module according to some example embodiments of the inventive concept.

Referring to FIG. 10A, a display panel DP is formed. In the display panel DP, a central part C-A and a peripheral part P-A surrounding the central part C-A may be defined.

An optical distance adjustment layer OLL is formed on the display panel DP. The optical distance adjustment layer OLL may include a light transmissive material.

Figure 10B:
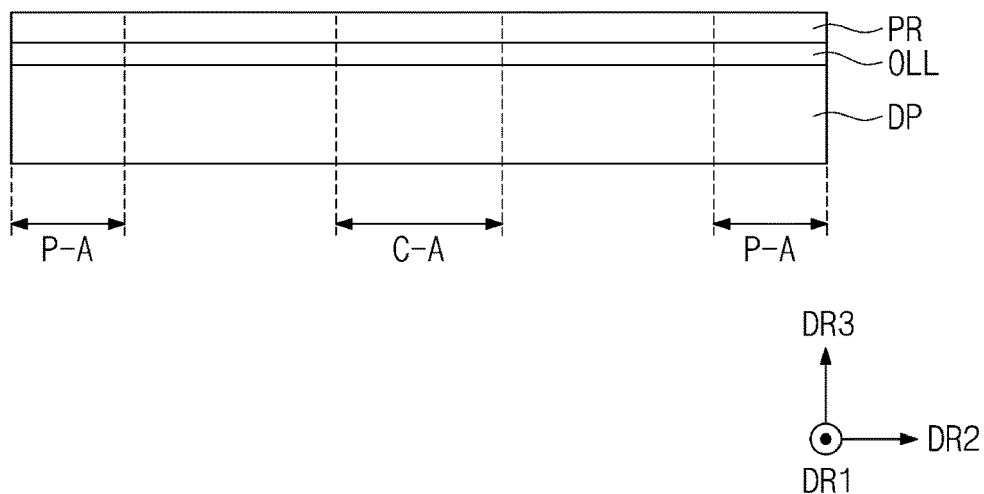

Referring to FIG. 10B, a photoresist layer PR is formed on the optical distance adjustment layer OLL. The photoresist layer PR may include a positive photoresist material or a negative photoresist material.

Figure 10C:
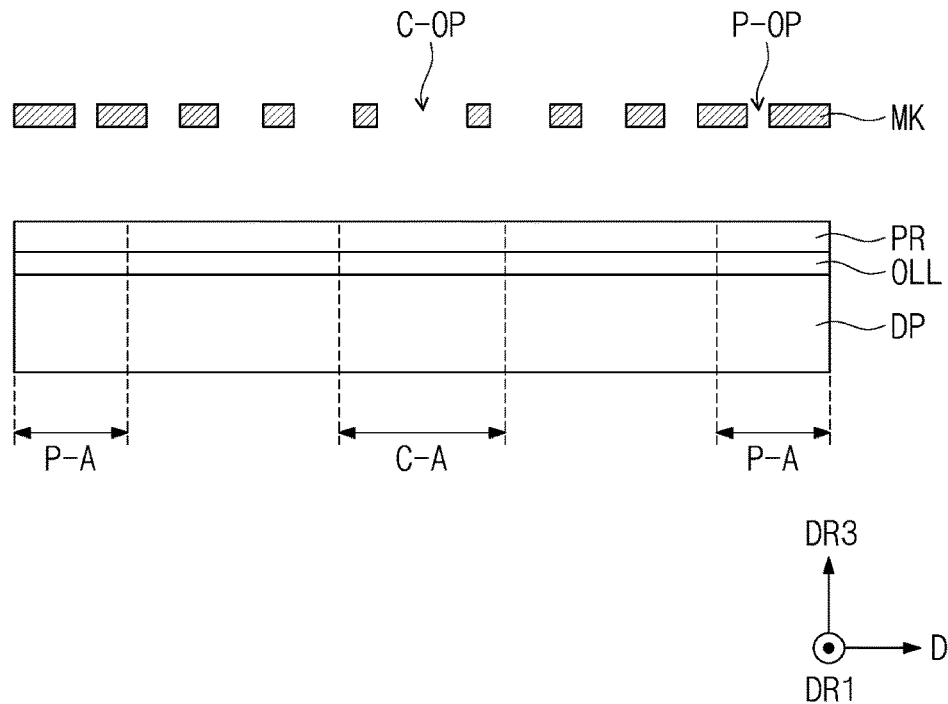

Referring to FIG. 10C, a mask MK is located on the photoresist layer PR. The mask MK may be a binary mask including a light transmissive part and a light blocking part. The mask MK may include: a central region overlapping the central part C-A when viewed in a plan view, and a peripheral region overlapping the peripheral region P-A when viewed in a plan view. The light transmissive part may include: a central opening patter C-OP defined in the central region; and a peripheral opening pattern P-OP defined in the peripheral region. The central opening pattern C-OP may be located on the central part C-A of the display panel DP, and the peripheral opening pattern P-OP may be located on the peripheral part P-A of the display panel DP.

The transmittance of light passing through the mask MK may be adjusted by adjusting the size of the mask MK. For example, the sizes of central opening patter C-OP and the peripheral opening pattern P-OP may be different from each other. When the photoresist layer PR includes a negative photoresist material, the width of the central opening patter C-OP in a second direction DR2 may be larger than the width of the peripheral opening patter P-OP in the second direction DR2. In addition, when the photoresist layer PR includes a positive photoresist material, the width of the central opening patter C-OP in the second direction DR2 may be smaller than the width of the peripheral opening patter P-OP in the second direction DR2.

In addition, according to some example embodiments of the inventive concept, the sizes of the central opening patter C-OP and the peripheral opening patter P-OP may also be the same. In this case, the time during which light is emitted to the central opening patter C-OP and the time during which light is emitted to the peripheral opening patter P-OP may be different from each other.

Lenses LS1 and LS2 (see FIGS. 7A and 7B) may be formed by patterning the photoresist layer PR. The patterning may include an exposition process and a development process.

Figure 10D:
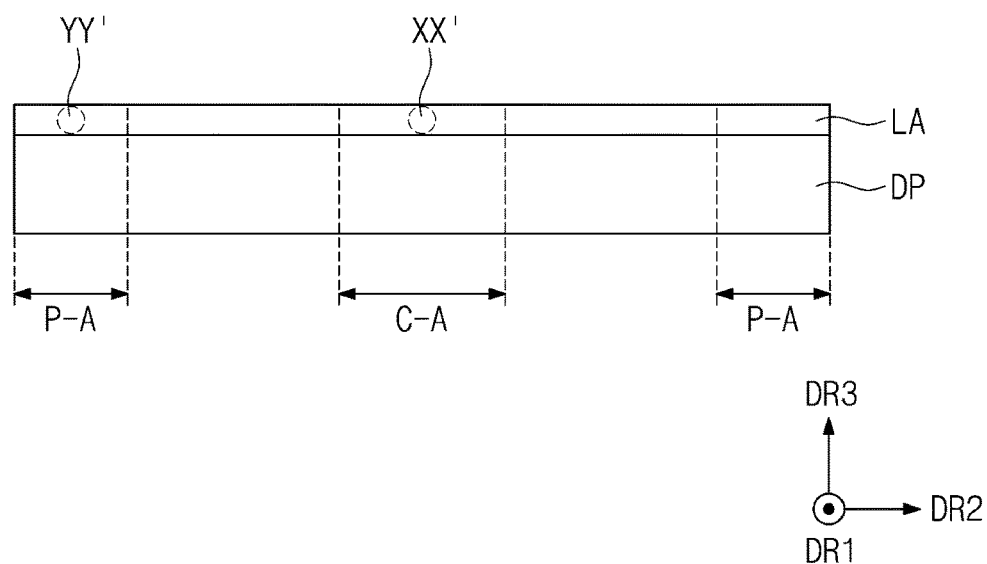

Referring to FIG. 10D, an enlarged version of region XX' of a lens array LA located on the central part C-A may correspond to the first lens LS1 of FIG. 7A. An enlarged version of region YY' of the lens array LA located on the peripheral part P-A may correspond to the lens LS2 of FIG. 7B. Lenses located on a region between the central part C-A and the peripheral part P-A may have curvatures between the curvature of the first lens LS1 and the curvature of the second lens LS2. In addition, according to some example embodiments of the inventive concept, the lenses may have a shape in which the closer to the peripheral part P-A, the smaller the curvature.

FIGS. 11A to 11D are cross-sectional views illustrating a method for manufacturing a display module according to some example embodiments of the inventive concept.

Figure 11A:
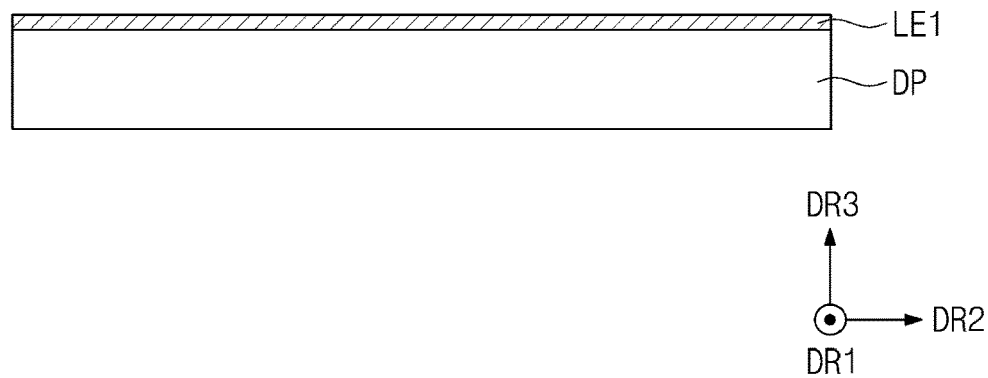
FIGS. 11A to 11D are cross-sectional views illustrating a method for manufacturing a display module according to some example embodiments of the inventive concept.

Referring to FIG. 11A, a first electrode LE1 is formed on a display panel DP. The first electrode LE1 may include a light transmissive material. For example, the first electrode LE1 may include at least any one among indium zinc oxide (IZO), indium tin oxide (ITO), indium gallium oxide (IGO), indium zinc gallium oxide (IGZO), or a mixture/compound thereof. However, the embodiments of the inventive concept are not limited thereto.

Figure 11B:
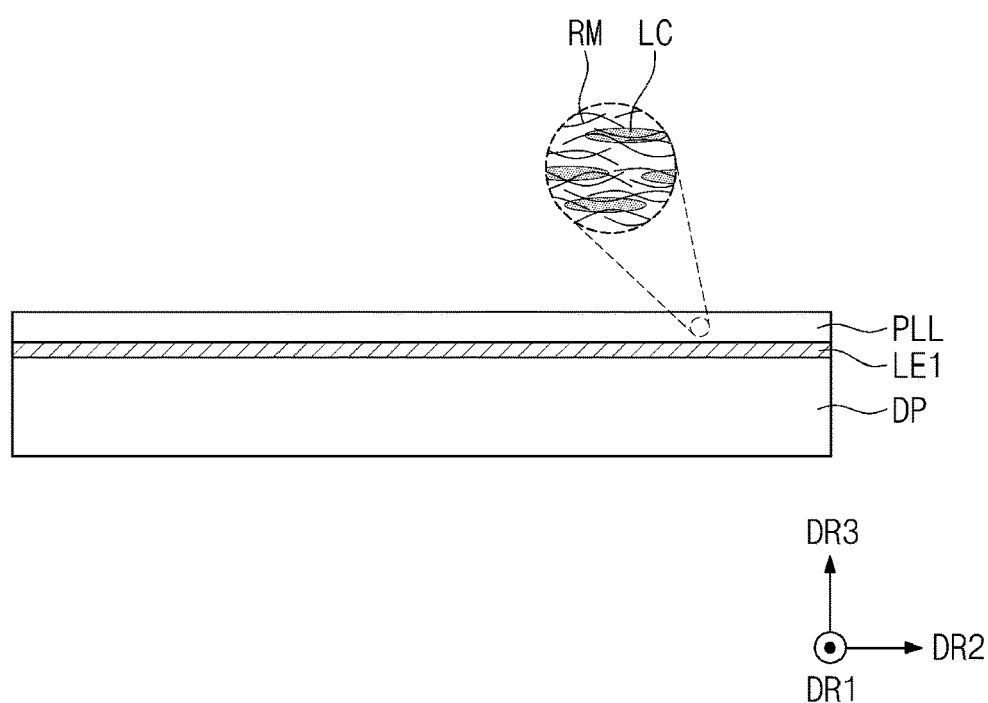

Referring to FIG. 11B, a preliminary layer PLL is formed on the first electrode LE1. The preliminary layer PLL may be a layer in which a reactive compounds RM and liquid crystal molecules LC are mixed. The reactive compounds RM may be photoreactive compounds. For example, the reactive compound RM may be cured by reacting with ultraviolet ray. In this case, a portion of liquid crystal molecules LC included in the preliminary layer PLL may be fixed in an initial orientation direction as the reactive compounds RM are cured.

Figure 11C:
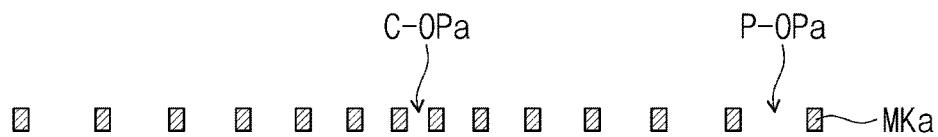
Figure 11C:
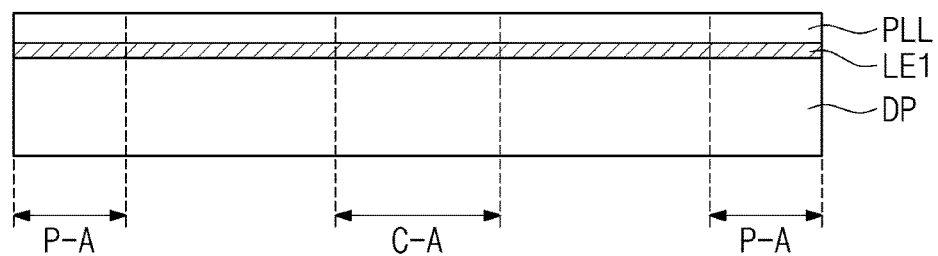
Figure 11C:
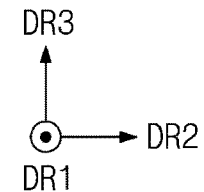

Referring to FIG. 11C, a mask MKa may be located on the preliminary layer PLL. The mask MKa may be a binary mask including a light transmissive part and a light blocking part. The light transmissive part may include a central opening pattern C-OPa and a peripheral opening pattern P-OPa. The central opening pattern C-OPa may be located on the central part C-A of the display panel DP, and the peripheral opening pattern P-OPa may be located on the peripheral part P-A of the display panel DP.

The sizes of central opening pattern C-OPa and the peripheral opening pattern P-OPa may be different from each other. For example, the width of the central opening pattern C-OPa in the second direction DR2 may be smaller than the width of the peripheral opening pattern P-OPa in the second direction DR2.

The difference in the sizes of the central opening pattern C-OPa and the peripheral opening pattern P-OPa may correspond to the difference in the sizes of the first fixed region FA1 (see FIG. 9A) and the second fixed region FA2 (see FIG. 9B).

Light is emitted through the mask MKa, and the reactive compounds of the preliminary layer may be cured.

Figure 11D:
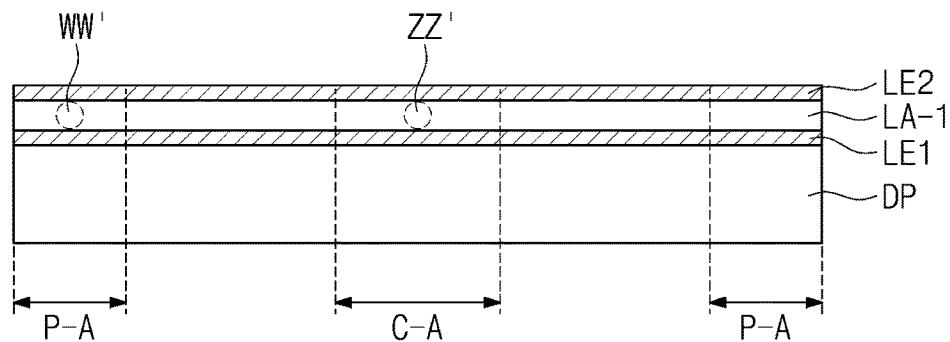
Figure 11D:
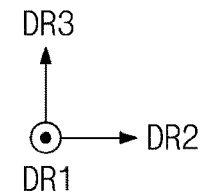

Referring to FIG. 11D, a lens array LA-1 may be formed by forming a first fixed region FA1 and a second fixed region FA2 on the preliminary layer PLL. A second electrode LE2 may be formed on the lens array LA-1. The second electrode LE2 may include at least any one among indium zinc oxide (IZO), indium tin oxide (ITO), indium gallium oxide (IGO), indium zinc gallium oxide (IGZO), or a mixture/compound thereof. However, the embodiments of the inventive concept are not limited thereto.

An enlarged version of one region ZZ' of the lens array LA-1 located on the central part C-A may correspond to the first lens LS1-1 of FIG. 9A. An enlarged version of one region WW' of the lens array LA-1 located on the peripheral part P-A may correspond to the second lens LS2-1 of FIG. 9B.

According to some example embodiments, a method for manufacturing a display module may further include forming an optical distance adjustment layer. The optical distance adjustment layer may be formed between the display panel DP and the first electrode LE1 or between the first electrode LE1 and the lens array LA-1.

According to some example embodiments of the inventive concept, a lens array located on a display panel may have at least two focal lengths. Because the deviation in focal lengths according positions inside the display panel, a user may view a video of clear images. In addition, images of the peripheral portion of the display panel may be clearly viewed, and thus, the viewing angle of the user may be increased. That is, display quality of a display device may be improved.

It will be apparent to those skilled in the art that various modifications and variations can be made in the present invention. Thus, it is intended that the present invention covers the modifications and variations of this invention provided they come within the scope of the appended claims and their equivalents. Hence, the real protective scope of the present invention shall be determined by the technical scope of the accompanying claims and their equivalents.

What is claimed is:

1. A display device comprising:
a display panel having a central part and a peripheral part surrounding the central part, the display panel comprising a plurality of pixels; and
a lens array on the display panel, wherein:
the lens array comprises a first lens on the central part and a second lens on the peripheral part such that the first lens and the second lens are laterally spaced apart from each other in a plan view;
a first focal length of the first lens is smaller than a second focal length of the second lens; and
each of the first lens and the second lens overlaps at least two pixels among the plurality of pixels,
wherein the first lens overlaps two or more pixels and five or less pixels among the plurality of pixels in the plan view.

2. The display device of claim 1, further comprising a body part accommodating the display panel and the lens array, wherein two opening parts are provided in one region of the body part facing the lens array.

3. The display device of claim 1, wherein a curvature of the first lens is larger than a curvature of the second lens.

4. The display device of claim 1, wherein a refractive index of the first lens is equal to a refractive index of the second lens.

5. The display device of claim 1, wherein a thickness of the first lens is larger than a thickness of the second lens.

6. The display device of claim 1, further comprising:
a first electrode under the first lens and the second lens; and
a second electrode on the first lens and the second lens, wherein each of the first lens and the second lens comprises a reactive compound and liquid crystal molecules.

7. The display device of claim 6, wherein:
fixed regions, in which orientation directions of the liquid crystal molecules are fixed by the reactive compound, are defined in the lens array;
the fixed regions comprise a first fixed region included in the first lens and a second fixed region included in the second lens; and
an area of the first fixed region and an area of the second fixed region are different from each other.

8. The display device of claim 7, wherein an area of the first fixed region is smaller than an area of the second fixed region.

9. The display device of claim 6, wherein a thickness of the first lens is equal to a thickness the second lens.

10. The display device of claim 1, wherein the first lens overlaps only five pixels among the plurality of pixels in the plan view.

11. The display device of claim 10, wherein the five pixels comprise a center pixel on a center and four peripheral pixels surrounding the center pixel.

12. The display device of claim 11, wherein a center of the first lens overlaps the center pixel in the plan view.

13. The display device of claim 11, wherein the center pixel is a green pixel, two peripheral pixels among the four peripheral pixels are red pixels, and a remaining two peripheral pixels are blue pixels.

14. The display device of claim 11, wherein the center pixel is a red pixel or a blue pixel, and the four peripheral pixels are green pixels.

15. A head mounted display device comprising:
a display panel having a central part and a peripheral part surrounding the central part, the display panel comprising a plurality of pixels; and
a lens array on the display panel, wherein:
the lens array comprises a first lens on the central part and a second lens on the peripheral part such that the first lens and the second lens are laterally spaced apart from each other in a plan view;
a first focal length of the first lens is smaller than a second focal length of the second lens; and
each of the first lens and the second lens overlaps at least two pixels among the plurality of pixels,
wherein the first lens overlaps two or more pixels and five or less pixels among the plurality of pixels in the plan view.

* * * * *